(12) United States Patent
Shimano et al.

(10) Patent No.: US 6,791,934 B2
(45) Date of Patent: Sep. 14, 2004

(54) OBJECTIVE LENS OPTICAL SYSTEM, OPTICAL HEAD AND OPTICAL INFORMATION REPRODUCTION APPARATUS

(75) Inventors: Takeshi Shimano, Tokorozawa (JP); Tetsuo Ariyoshi, Kokubunji (JP); Kazuo Shigematsu, Yoshikawa (JP); Koichi Maruyama, Tokyo (JP); Shuichi Takeuchi, Wako (JP)

(73) Assignees: Hitachi, Ltd., Tokyo (JP); PENTAX Corporation, Tokyo (JP)

( * ) Notice: Subject to any disclaimer, the term of this patent is extended or adjusted under 35 U.S.C. 154(b) by 183 days.

(21) Appl. No.: 10/076,663

(22) Filed: Feb. 19, 2002

(65) Prior Publication Data

US 2003/0076767 A1 Apr. 24, 2003

(30) Foreign Application Priority Data

Jun. 19, 2001 (JP) ........................................ 2001-185559

(51) Int. Cl.$^7$ ................................................ G11B 7/00
(52) U.S. Cl. .............................. 369/112.23; 369/44.23; 369/53.12
(58) Field of Search ......................... 369/44.23, 44.32, 369/53.12, 53.13, 53.19, 53.28, 112.01, 112.02, 112.23, 112.24, 112.25, 112.26

(56) References Cited

U.S. PATENT DOCUMENTS 5,726,436 A    3/1998   Oka et al.
6,430,137 B1 * 8/2002   Saimi et al. ............. 369/112.1
6,532,202 B1 * 3/2003   Wada et al. ........... 369/112.02

FOREIGN PATENT DOCUMENTS

| JP | 7-140381 | 11/1993 |
| JP | 7-140382 | 11/1993 |
| JP | 7-151963 | 11/1993 |
| JP | 9-311271 | 5/1996 |
| JP | 2000-182254 | 12/1998 |
| JP | 2000-214048 | 1/1999 |
| JP | 2001-4972 | 6/1999 |

* cited by examiner

*Primary Examiner*—Paul W. Huber
(74) *Attorney, Agent, or Firm*—Reed Smith LLP; Stanley P. Fisher, Esq.; Juan Carlos A. Marquez, Esq.

(57) ABSTRACT

When it is intended to realize a lens having a large NA with one lens, an adjustment precision between both surfaces of the lens is very strict. Accordingly an objective lens having an NA of 0.8 or more was usually realized by two lenses. However, a working distance is small, and collision of the objective lens with a disc is apt to occur. A coma corrector for compensating coma caused by decentering of both surfaces in realizing the high NA lens with one lens is added. However, in this case, astigmatism occurs when the objective lens decenters from the coma corrector relatively accompanied with a tracking operation. The objective lens and the coma corrector are fixed to a mirror barrel so as to be unified with each other, and driven by a two-dimensional lens actuator. With such a constitution, decentering of the objective lens and the coma corrector does not occur, and hence astigmatism does not occur.

7 Claims, 16 Drawing Sheets

$NA = n \cdot \sin\theta$ focus error signal : FES=FE1-FE2
spherical aberration signal : SAS=(FO1-FO2)-G(FI1-FI2)

FIG.8(a)

Fundamental surface parameters

| | curvature radius R(mm) | fundamental surface parameters (mm) | refractive index n(405nm) | Abbe number vd | refractive index nd |
|---|---|---|---|---|---|
| chromatic aberration compensator | ∞ | 2 | 1.81656 | 47.4 | 1.78 |
| | -2.822 | 0.8 | 1.81656 | 26.5 | 1.76182 |
| | 2.822 | 2 | 1.81656 | 47.4 | 1.78 |
| | ∞ | 10 | 1 | | |
| expander | -8.25 | 1 | 1.74149 | 30.1 | 1.69895 |
| | ∞ | 1.61 | 1 | | |
| | ∞ | 1.4 | 1.84608 | 46.6 | 1.816 |
| | -11.891 | 10 | 1 | | |
| coma compensator | ∞ | 1.4 | 1.56023 | 55.7 | 1.54358 |
| | ∞ | 10 | 1 | | |
| objective lens | 1.735 | 2.35 | 1.7625 | 40.5 | 1.73077 |
| | 24.657 | 0.913 | 1 | | |
| cover layer | ∞ | 0.1 | 1.62231 | 29.9 | 1.58547 |
| | ∞ | | | | |
| paraxial parameters | | objective lens only | with expander | | |
| | f(mm) | 2.34369 | 1.85554 | | |
| | diameter(mm) | 3.984273 | 3.15442 | | |

FIG.8(b)

aspherical coefficients

| | cornic constant κ | aspherical coefficients | | | | |
|---|---|---|---|---|---|---|
| | | A | B | C | D | E |
| coma compensator | 0 | 6.10E-04 | 3.80E-05 | 2.80E-06 | -3.00E-07 | 1.40E-07 |
| | 0 | 6.52E-04 | 1.34E-05 | 9.64E-06 | -7.84E-07 | 1.45E-07 |
| objective lens | -0.385 | 1.11E-04 | 4.45E-05 | 8.07E-06 | 6.75E-06 | -2.22E-06 |
| | 0 | 5.57E-02 | -2.95E-02 | 1.12E-02 | -2.41E-03 | 2.25E-04 | aspherical shape $$z = \frac{r^2}{R+\sqrt{R^2-(\kappa+1)r^2}} + Ar^4 + Br^6 + Cr^8 + Dr^{10} + Er^{12}$$

decentering of both surfaces of objective lens : 6 μm
wavefront aberration : 0.369 λ rms decentering of both surfaces of objective lens : 6 μm
tilt of coma compensator : 4°
wavefront aberration : 0.009 λ rms surface shape aberrations surface shape aberrations surface shape aberrations

OBJECTIVE LENS OPTICAL SYSTEM, OPTICAL HEAD AND OPTICAL INFORMATION REPRODUCTION APPARATUS

BACKGROUND OF THE INVENTION

The present invention relates to an optical information reproducing apparatus for reproducing a next-generation high density optical disc, as well as to an optical head and an objective lens optical system which are incorporated therein.

Recent years, high-density recording of an optical disc has been steadily developed, and in a digital versatile disc (DVD) the storage capacity of both of a read-only memory disc (ROM) and a rewritable disc (RAM) is as high as 4.7 GB. In addition to this, in recent years at which satellite broadcasting is to be digitized immediately, the optical disc is expected to be large capacity of 20 GB or more where high definition moving picture can be recorded for two hours or more.

A size of a light beam spot that directly restricts a recording density of the optical disc is given as $\lambda/NA$ when a wavelength of a light beam is represented as $\lambda$ and a numerical aperture of an objective lens is represented as NA. Accordingly, the wavelength must be set short or the numerical aperture must be set large in order to realize an optical disc with large capacity. With respect to the wavelength, development of a blue-violet laser diode which emit a light beam of 405 nm has been advanced, and it has been forecasted to realize an optical disc with capacity of 12 GB that is about 2.6 times as large as the present DVD for which a light beam of 650 nm is used. In order to further increase the capacity to 20 GB or more, NA must be increased to be 1.3 times as large as the present DVD, that is, 0.77 or more.

As the conventional technology to increase NA as described above, there has been, for example, Japanese Patent Laid-Open No. 11(1999)-195229. In this technology, NA is increased to 0.85 as the maximum value by use of an objective lens which is composed of two lens elements in two groups. Accompanied with the increase of NA at this time, there is a problem that a spherical aberration and a coma, which are caused by an error of a substrate thickness of a disc and an inclination thereof, increase. To cope with such a problem, the coma due to the inclination of the disc is decreased by decreasing the substrate thickness to 0.1 mm, and the spherical aberration due to the error of the substrate thickness is compensated by detecting the substrate thickness based on a difference of a focus error signal between a disc surface and a recording surface and by changing an interval between the two lenses in response to the substrate thickness. Herein, an interval between a final surface of the lens system and the surface of the substrate surface of the disc when a recording film is focused, that is, a working distance, is 0.13 mm, and an effective pupil diameter of the two-element objective lens is 3 mm $\phi$.

In the above described prior arts, when the working distance is very short and a focus servo comes off by any chance during a recording/reproduction operation, the lens collides against the disc and the disc may be damaged. Moreover, there is a problem that a permissible limit of the interval between the two lenses and decentering of the two lenses relative to each other are very strict and adjustment is difficult.

The simplest and essential means for widen the working distance of the high NA lens in the above described prior arts is to use one lens in stead of the two lenses. This means is described by use of FIGS. 1(a) and 1(b). FIG. 1(a) shows a state where the conventional two lenses 101 and 102 collect a light beam, and FIG. 1(b) is a schematic view showing a difference of the working distance when the light beam collection is performed by one high NA lens 103. In both of FIGS. 1(a) and 1(b), luminous flux is collected in a recording film 105 through a protection layer 104 of a disc by the same NA. In FIG. 1(a), in order to respectively distribute refractive power to the two lenses 101 and 102, the second lens 102 will be inserted in the luminous flux collected by the first lens 101. Therefore, compared to the case of FIG. 1(b) where the luminous flux is collected by one lens, an effective pupil diameter D2 of the lens is smaller than an effective pupil diameter D of FIG. 1(b), and a working distance WD1 is obliged to be shorter than a working distance WD2 of FIG. 1(b). On the contrary, the working distance can be further widened by collecting the luminous flux by one lens than by collecting the luminous flux by the conventional two lenses. However, as a matter of course, the reason why the two lenses are necessary has heretofore been existed. This is a problem in manufacturing the lens. In a lens offering a large NA, necessary precision concerning a decentering between both surfaces of the lens and an error of a surface interval between both surfaces of the lens is very strict, and large aberration occurs by a slight error. To avoid the aberration, by dispersing the necessary refractive power conventionally to the two lenses, manufacturing of the respective lenses is made easier. Accordingly, to acquire a high NA with one lens, either a manufacture technology to increase a positional precision between both surfaces of the lens or means for compensating the aberration caused by a manufacture error is necessary.

With respect to means for compensating the aberration, there is, for example, means described in Japanese Patent Laid-Open No. 12(2000)-182254, which compensates a spherical aberration caused by the error of the surface interval. In this Japanese Patent Laid-Open No. 12(2000)-182254, a spherical aberration at a light convergence spot is optically detected, and luminous flux made incident on an objective lens is slightly diverged or converged, whereby a spherical aberration compensation optical system for causing spherical aberration is driven and spherical aberration of an optical system is compensated. The error of the surface interval between the first and second surfaces of one lens with a high NA can be compensated by combining such technologies. At this time, the light beam itself made incident on the lens does not show aberration, and spherical aberration occurs in an objective lens by allowing the light beam, which changes its diversion/conversion state, to be incident on the objective lens. Accordingly, even if the lens moves from an optical axis in a radius direction of a disc by a tracking operation, an axis of the spherical aberration generated does not swerve substantially.

With respect to coma caused by decentering, for example, a detection method of coma is described in Japanese Patent Laid-Open No. 12(2000)-214048. In this Japanese Patent Laid-Open No. 12(2000)-214048, the coma in a radius direction of a disc is detected based on difference of a push-pull signal between an inner side of luminous flux and an outer side thereof, and coma in a tangent direction is detected based on difference of a push-pull signal in a diagonal direction among four segmented regions split in a radius direction of the disc and a tangent direction thereof. As compensation means, for example, in Japanese Patent Laid-Open No. 13(2001)-4972, a technology is described, in which coma is given by giving a phase distribution having a sign reverse to that a W-shaped phase distribution given in the form of a fourth order function with a shift. By combining these technologies, the detection of the coma and the compensation thereof are made possible. However, in this case, the coma does not occur in the objective lens unlike the case of the foregoing spherical aberration compensation, and the coma occurs in a compensation device of the coma. Accordingly, if the objective lens deviates from an optical axis by a tracking operation, an axis of the coma deviates in accordance with the deviation of the objective lens. In this case, since the axis of the coma of the objective lens to be compensated and the axis of the coma compensated swerve from each other, astigmatism occurs substantially owing to a difference of the axes. This can be understood by the following equations simply. When coordinates in a section of luminous flux is expressed by polar coordinates $(\rho, \theta)$ while using the optical axis as the origin, the coma is given by the equation (1), $$W_1 = W_{31} \rho^3 \cos \theta \qquad (1)$$

where $W_{31}$ is a Seidel's aberration coefficient representing a scale of the coma, and a direction where the coma occurs is assumed to be a 0° direction. This is assumed to be a coma of the objective lens to be compensated. Next, when it is assumed that the lens swerves to the 0° direction by $\Delta$, a coma substantially compensated by a coma corrector is given by the equation (2), $$W_2 = W_{31}\{(x - \Delta)^2 + y^2\}^{3/2} \cos\theta \qquad (2)$$
$$\cong W_{31}\rho^3 \cos\theta - 3W_{31}\Delta\rho^2 \cos^2\theta$$

where (x, y) represents orthogonal coordinates and is related to the polar coordinates by the following equation (3).

$$\rho^2 = x^2 + y^2 \qquad (3)$$

Accordingly, it is proved that the aberration after compensation is a function which takes the form of astigmatism in proportion to the swerve $\Delta$ as shown by the equation (4).

$$W_1 - W_2 \cong 3W_{31}\Delta\rho^2 \cos^2\theta \qquad (4)$$

SUMMARY OF THE INVENTION

From the viewpoint of the above described problems, in compensating coma of the aberration compensation optical system which realizes one objective lens with a wide working distance and a high NA and which can be adjusted easily, an object of the present invention is to reduce astigmatism caused by swerve of an axis of coma of the aberration compensation optical system compensated from an axis of coma thereof to be compensated accompanied with a tracking operation.

To solve the foregoing subject, in the present invention, used is an objective lens optical system in which a coma corrector and one objective lens formed of a single medium are united with each other through a case so that both are positioned fixedly while keeping a mutual positional relationship therebetween, the one objective lens having a numerical aperture of 0.8 or more and collecting luminous flux incident thereon through the coma corrector beyond a transparent substrate.

In an optical head, in a light beam convergence optical system which collects a diverging light beam from a semiconductor laser in the optical head onto an optical information recording medium having a transparent protection layer, the foregoing objective lens optical system is loaded on an actuator which makes a position of a light convergence spot onto the optical information recording medium variable, and a reflection light beam from the optical information recording medium is split from an optical path extending from the foregoing semiconductor laser to the optical information recording medium by a beam splitting device to be guided to a photodetector by a photo detection system, followed by detection of an intensity of the reflection light beam as an electric signal. Herein, the optical head is constituted by parts from which a light beam emits and onto which a light beam is incident, and by parts such as a holder and a case, which directly hold the parts except for an optical disc. The optical head generally does not comprise an arithmetic circuit for a signal output from the photodetector and a driving circuit for driving a light beam source.

In an optical information reproducing apparatus using such an optical head, a light convergence spot position control signal detection circuit is constituted based on the output signal from the photodetector together with the optical information reproducing apparatus, and the actuator is driven by a control signal.

Furthermore, as one of other optical information reproducing apparatus according to the present invention, two actuators of a fine actuator and a coarse actuator are used as the actuator which makes the light convergence spot on the optical information medium variable. The fine actuator drives an objective lens with a NA of 0.8 or more independently from a coma corrector, and compensates high-frequency components of a tracking signal. The coarse actuator drives a portion including a light beam convergence optical system and the fine actuator, or the whole of the optical head including these to compensate low-frequency components of a tracking error signal. In the case where the whole of the optical head is loaded on the coarse actuator, in a light beam convergence optical system of the optical head which collects a diverging light beam from the semiconductor laser onto the optical information recording medium having a transparent protection layer, in a case accommodated unitedly are a beam splitting device for splitting a reflection light beam from an optical information recording medium from an optical path extending from a semiconductor laser to an optical information recording medium; a detection optical system for guiding the reflection light beam split from the beam splitting device to a photodetector; and the photodetector for detecting an intensity of the reflection light beam as an electric signal. In the case where the portion including the light beam convergence optical system and the fine actuator is loaded on the coarse actuator, the optical head is divided into a fixed optical system including the semiconductor laser and the photodetector and a movable optical system loaded on the fine actuator.

In the above described optical head and optical information reproducing apparatus, it is possible to compensate spherical aberration resulting from spherical aberration indigenous to a lens and a thickness error of a disc substrate by loading a spherical aberration compensator on the light beam convergence optical system.

In the above described optical head and optical information reproducing apparatus, both surfaces of the coma corrector may be formed by a rotation symmetry fourth order curved surface with a curvature on the center axis equal to approximately zero. Alternatively, the coma corrector may be a liquid crystal phase compensator.

It is possible to provide the optical disc apparatus with a high reliability by the present invention, in which the objective lens having a large NA and a working distance can be realized by the present invention, and in which a lens hardly collides with the disc.

BRIEF DESCRIPTION OF THE DRAWINGS

FIGS. 8(a) and 8(b) are tables showing a design example of a lens surface with a shape coefficient based on the present invention.

DETAILED DESCRIPTION OF THE PREFERRED EMBODIMENTS

Figure 1A:
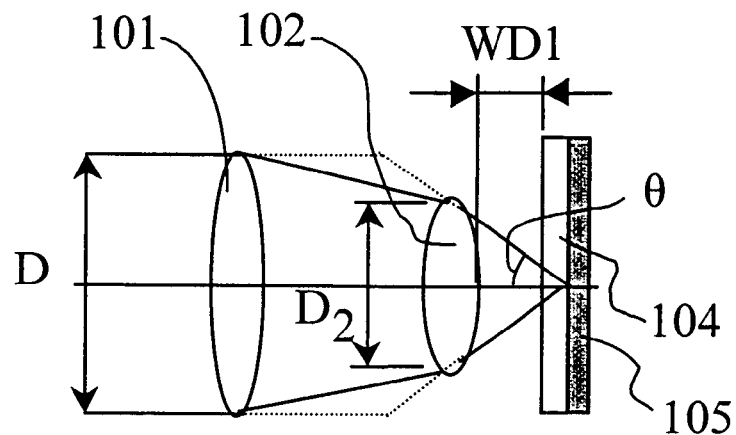
FIGS. 1(a) and 1(b) are schematic views for comparing a working distance of conventional two lenses with that of one high NA lens.
Figure 1B:
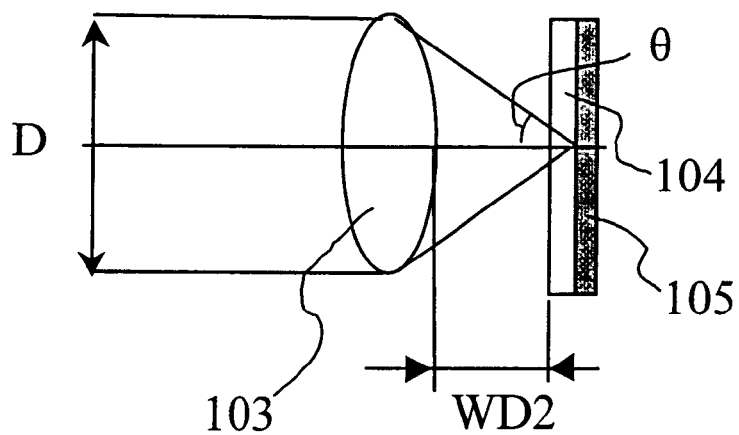

Embodiments of the present invention will be described in detail by use of the accompanied drawings. In the following drawings, constituent components corresponding to those in other drawings will be denoted using the same reference numerals, and repeated explanations for them will be omitted.

Figure 2:
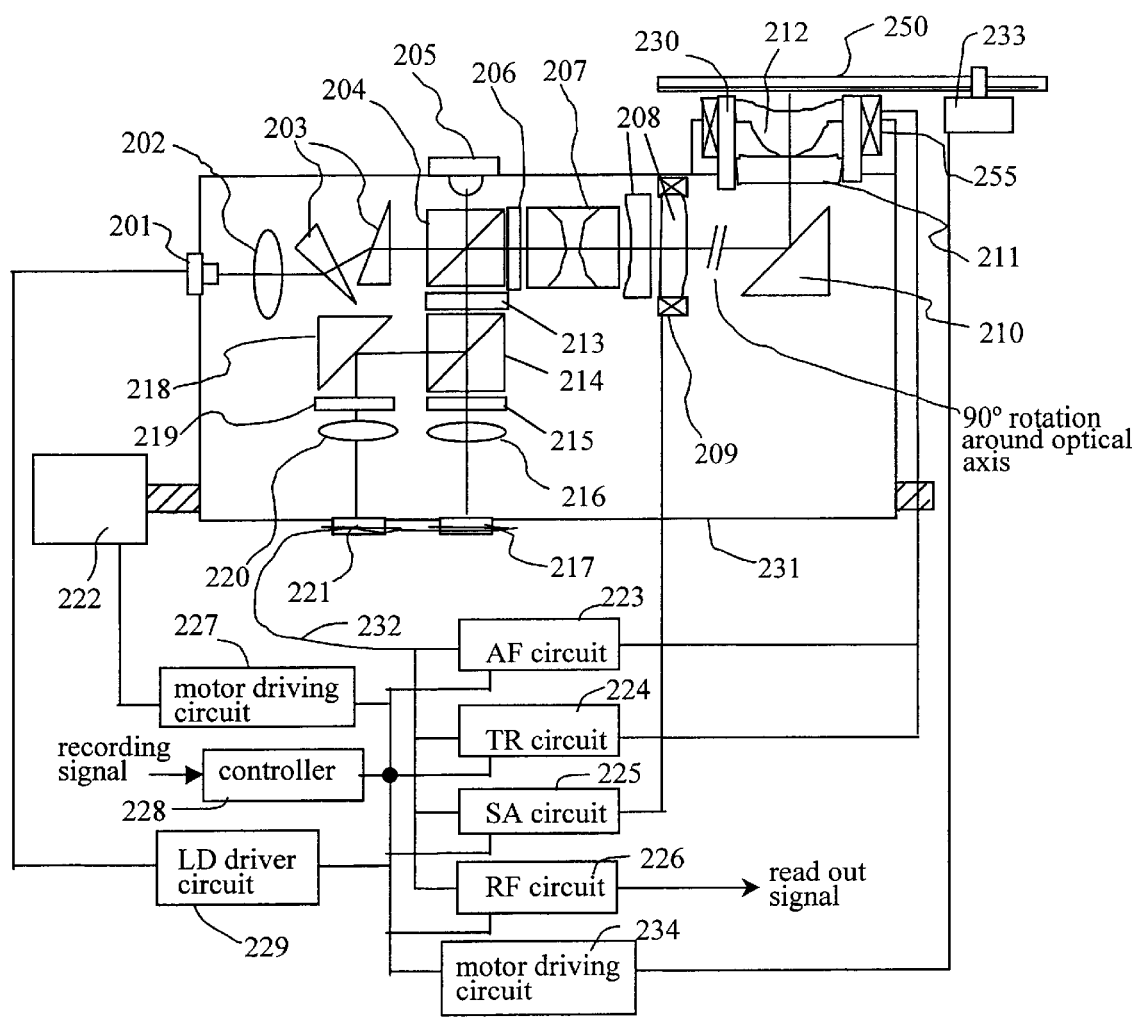
FIG. 2 is a diagram showing an experiment system for confirming effects of the present invention.

In FIG. 2, an experiment system for confirming effects of the present invention is illustrated as a first embodiment of the present invention. A light beam from a semiconductor laser 201 is converted to a parallel light beam by a collimator lens 202, and further converted to a light beam having substantially circular cross-sectional shape by a beam shaping prism 201. The isotropic beam passes through a polarization beam splitter 204, and is collected on a recording film of an optical disc 250 via a λ/4 plate 206, a chromatic aberration compensator lens 207, an expander lens 208 for compensating spherical aberration, a prism mirror 210, a coma corrector 211 and an objective lens 212. Herein, the light beam partially reflected by the polarization beam splitter 204 is received and detected by a front monitor detector 205, and used for auto power control of the semiconductor laser 201.

The expander lens 208 is constituted by a pair of concave and convex lenses. Herein, the convex lens is loaded on an actuator 209 which is movable in an axis direction. With such a structure, the two lenses are capable of changing an interval therebetween freely, and producing arbitrary spherical aberration in accordance with the interval. When manufacture error of an interval between both surfaces of the objective lens 212 and a thickness error of a disc substrate exist, spherical aberration caused when recording/reproduction is effectively performed for an optical disc such as a two-layered disc having a plurality of substrates thicknesses is compensated by use of effects thereof. There is no problem if the concave lens is loaded on the actuator. The illustration in FIG. 2, in which the double lines seem to cut the line showing the optical axis between the expander lens 208 and the prism mirror 210, means that, from the expander lens 208 onward in the actual optical system on the disc side, a ray is risen up toward a direction perpendicular to a paper plane by the prism mirror 210.

The coma corrector 211 is adjusted so as to compensate coma caused by decentering of both surfaces of the objective lens 212, and fixed to a lens barrel 230 together with the objective lens 212. The coma corrector 211 is a device having both surfaces, each of which is a fourth order curved surface without refractive force disposed so as to cancel spherical aberration as described later, and generates the coma by causing decentering of both of the fourth order curved surfaces relative to each other effectively. Herein, a tilt of the coma corrector 211 relative to the objective lens is adjusted so as to compensate the coma caused by the decentering of the both surfaces of the objective lens relative to each other, and the coma corrector 211 is fixed to the lens barrel 230. This lens barrel 230 is loaded on a two-dimensional actuator 255. Accordingly, since the objective lens 212 and the coma corrector 211 move together in a focus control and a tracking control, a relative position deviation between them does not occur.

The light beam reflected from the optical disc 250 travels back on the same optical path, and is reflected by the polarization beam splitter 204. Then, the light beam passes through a λ/2 plate 213, and is incident onto a second polarization beam splitter 214. A part of the light beam incident onto the second polarization beam splitter 214 passes therethrough, and the remainder thereof is reflected. The light beam which passed through the second polarization beam splitter 214 passes through a beam splitting hologram 215, and is collected in a photodetector 217 by a collector lens 216. The photodetector 217 detects a tracking error signal by use of a push-pull method, and detects a reproduction RF signal. Therefore, in the beam splitting hologram 215, the lattice pattern is made so that each portion of the incident light beam divided by a diameter in a direction corresponding to a tracing direction of the disc is diffracted in different direction. The photodetector 217 detects the tracking signal by receiving the diffracted light beams. By designing diffraction effects of the beam splitting hologram 215, zero order light beam is made capable of obtaining a necessary S/N ratio, and the zero order light beam is detected, whereby a RF signal is obtained.

Figure 3:
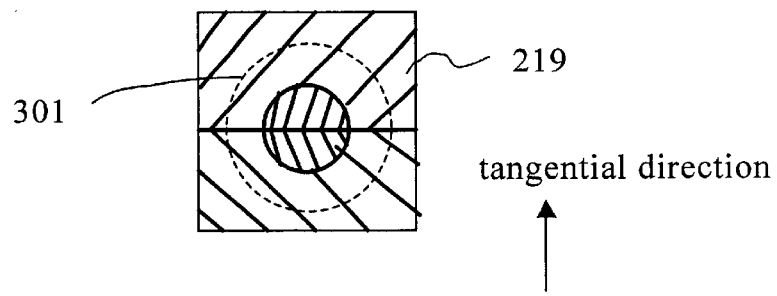
FIG. 3 is a schematic view showing of a beam splitting hologram for detecting spherical aberration and focus error.
Figure 4:
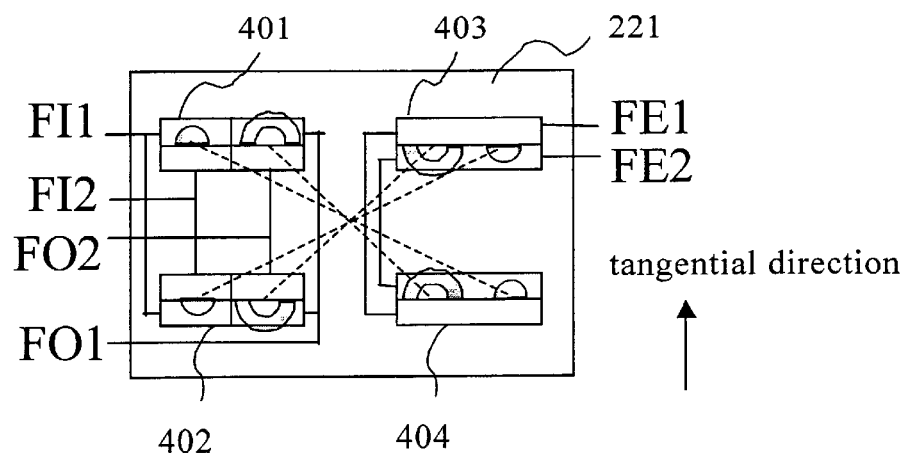
FIG. 4 is a schematic view showing a photodetector for detecting spherical aberration and focus error.

The light beam reflected by the polarization beam splitter 214 is reflected by a reflection prism 218, and collected in a photodetector 221 by a collector lens 220 after passing through a second beam splitting hologram 219. To obtain a focus error signal and a spherical aberration signal in the photodetector 221, the beam splitting hologram 219 is as illustrated in FIG. 3, and a light receiving patterns of the photodetector 221 is as illustrated in FIG. 4. By use of the hologram of FIG. 3, the light beams in the four regions in total, which include the inside and outside regions of the incident light flux 301, and the regions on both sides thereof split by a diameter perpendicular to a tracking direction of the disc, are diffracted into different directions.

In the photodetector 221 illustrated in FIG. 4, with respect to the light beams diffracted in the above described manner, a spherical aberration signal is obtained by determining a difference between a focus signal of the inside luminous flux and a focus signal of the outside luminous flux by use of the two four-segmented light receiving regions 401 and 402. Moreover, an ordinary focus error signal is obtained from the two two-segmented light receiving regions 403 and 404. When a calculation for the difference is executed, this embodiment was designed so that a gain G can be adjusted so as to be able to compensate unbalance between a light amount of the inside and outside luminous fluxes. In this embodiment, moreover, the inside and outside luminous fluxes on one side among the diffracted light beams produced on both sides of the zero order light beam are incident onto the same light receiving section, and a sum calculation is optically executed.

In FIG. 2, output signals from the photodetector 221 and a photodetector 217 are fetched out via a flexible cable 232, and the above described calculations are executed by use of AF, TR, SA and RF circuits 223, 224, 225 and 226. Herein, the AF circuit 223 performs a calculation of the focus error signal and driving of a focus control coil of the two-dimensional actuator 255, and the TR circuit 224 performs a calculation of the tracking signal and driving of a tracking control coil of the two-dimensional actuator 255. The SA circuit 225 performs a calculation of the spherical aberration signal and driving of the expander lens actuator 208, and the RF circuit 226 performs a detection of the reproduction RF signal.

Since a range of a tracking control of the two-dimensional actuator 255 is usually about ±400 μm, the whole of the optical head incorporated in the case 231 is moved in a radius direction of the disc by a coarse actuator 222 in order for the light convergence spot by the objective lens 212 to cover an overall signal recording region of the optical disc 250. The coarse actuator 222 is driven by a motor driving circuit 227. Furthermore, a spindle motor 233 for rotating the optical disc 250 is driven by a motor driving circuit 234. The semiconductor laser 201 is driven by a laser driver circuit 229. The above described circuits are synthetically controlled by a control section 228.

In the foregoing experiment system, since the coma corrector 211 is integrated with the objective lens 212, driving of the coarse actuator 222 by the low-frequency component of the tracking signal is especially unnecessary, which is necessary when the coma corrector 211 and the objective lens 212 are provided individually from each other.

Figure 5A:
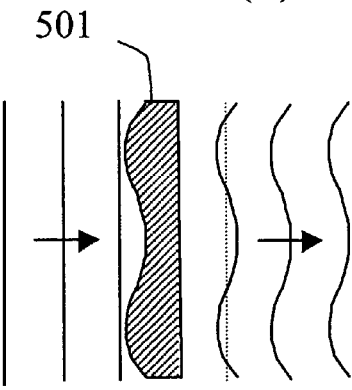
FIGS. 5(a) to 5(e) are schematic views showing a principle of a coma corrector.
Figure 5B:
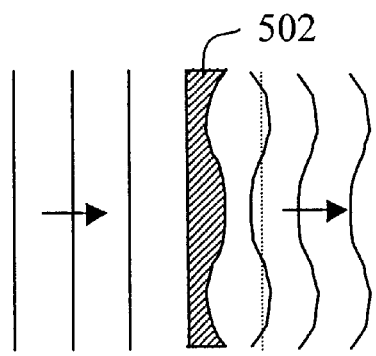

A principle of the coma corrector 211 will be explained by use of FIGS. 5(a) and 5(b). The coma corrector has both surfaces, each of which is formed by a fourth order curved surface without refractive power. In FIGS. 5(a) to 5(e), effects of these surfaces are independently illustrated, and then effects by occurrence of the coma when the surfaces are combined will be illustrated.

Figure 5C:
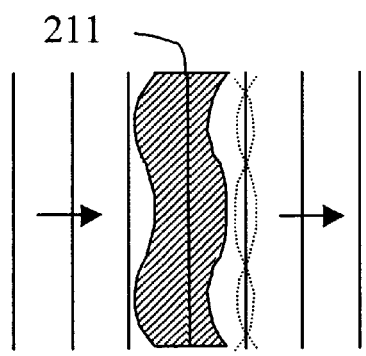
Figure 5D:
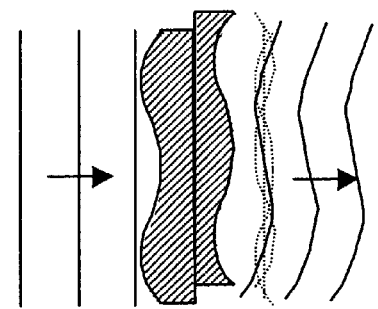
Figure 5E:
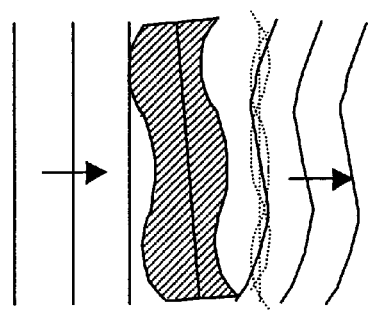

FIG. 5(a) illustrates the effect exhibited by a first surface alone of the two fourth order curved surfaces. Spherical aberration which reflects a first surface shape of the phase modulator on a flat incidence wavefront occurs in an emission wavefront. FIG. 5(b) illustrates effects of a second surface alone. Spherical aberration in which a flat incidence wavefront is phase-modulated to a curved surface reverse to that of FIG. 5(a) occurs in an emission wavefront by a second phase modulator 502 in which a first surface is flat and a second surface is a fourth order curved surface without refractive power. FIG. 5(c) illustrates a coma corrector 211 constituted by combining the phase modulators of FIGS. 5(a) and 5(b). At this time, since an emission wavefront is a sum of the emission wavefronts of FIGS. 5(a) and 5(b), the respective spherical aberrations are canceled in the end, and the emission wavefront is a flat plane. FIG. 5(d) illustrates a case where decentering of the phase modulators 501 and 502 relative to each other occurs. Since the emission wavefront of FIG. 5(a) and the emission wavefront of FIG. 5(b), which are illustrated by broken lines in FIG. 5(d), are summed in a state where they are deviated from each other, coma occurs in a wavefront shown by solid lines in FIG. 5(d), which is obtained by synthesizing them. FIG. 5(e) illustrates that the same effects as the above can be obtained by simply tilting the coma corrector 211. Since the coma corrector has no refractive power, the same effect as that of decentering is exhibited by tilting the coma corrector 211, and coma occurs in the emission wavefront in the similar manner to the case of FIG. 5(d).

The effects of occurrence of the coma will be described by use of the following equations below. Assuming that the aberration occurring by the first surface of the coma corrector is represented by the following equation (5), $$W_3 = W_{40}(\rho^4 - \rho^2 + 1/6) \tag{5}$$

and assuming that the aberration is represented by the following equation (6) when spherical aberration occurring in the second surface is deviated in a x-direction by Δ, $$W_4 = -W_{40}[\{(x-\Delta)^2 + y^2\}^2 - \{(x-\Delta)^2 + y^2\} + 1/6] \tag{6}$$
$$\cong -W_{40}(\rho^4 - \rho^2 + 1/6) + 4W_{40}\Delta\rho^3\cos\theta - 2W_{40}\Delta\rho\cos\theta$$

It is proved that, in the sum of them, the component of the coma occurs as expressed by the following equation (7).

$$W_3 + W_4 \cong 4W_{40}\Delta\rho^3 \cos\theta - 2W_{40}\Delta\rho \cos\theta \tag{7}$$

Figure 6:
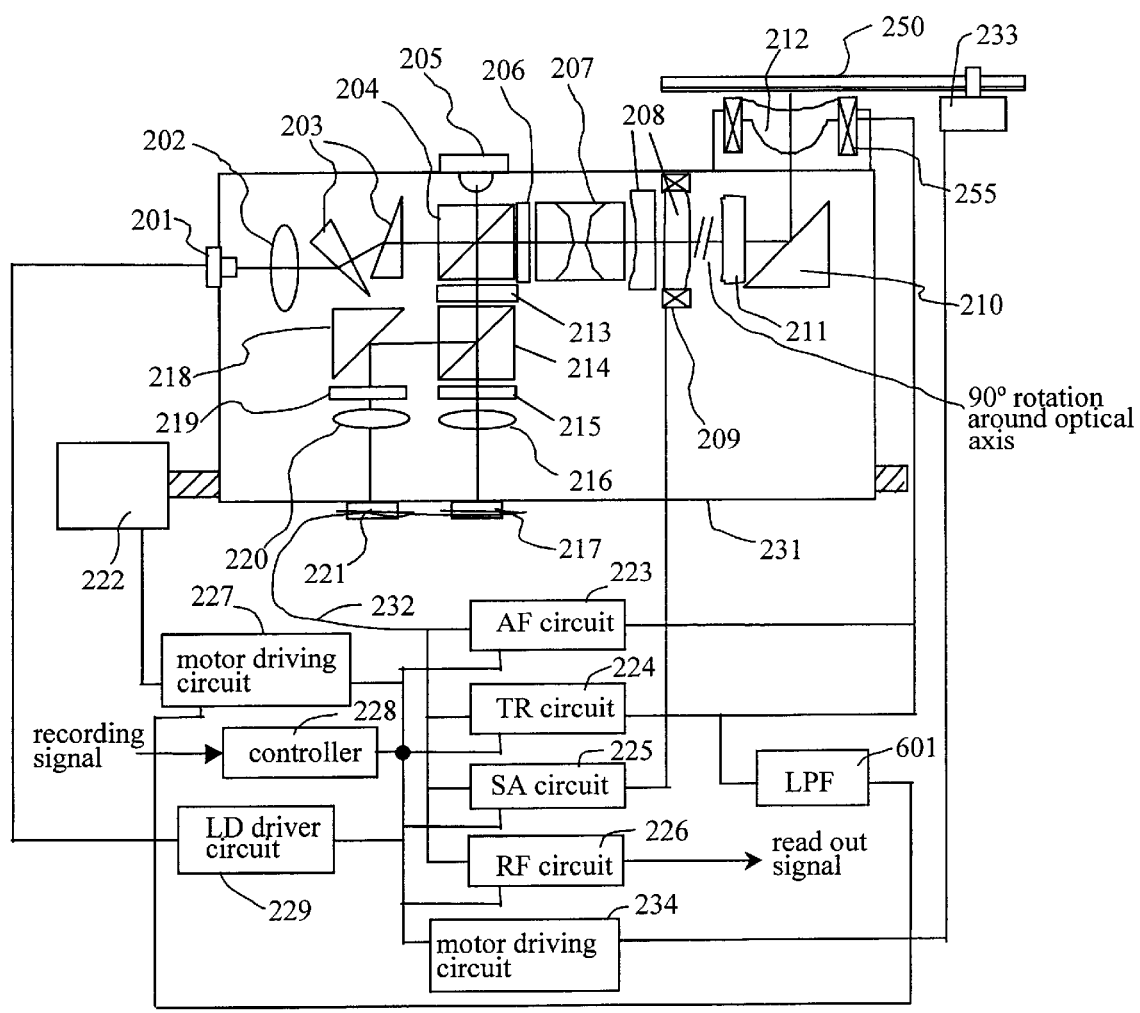
FIG. 6 is a diagram showing a second embodiment of the present invention.

FIG. 6 illustrates a second embodiment of the present invention. A significant difference when the second embodiment is compared with the first embodiment illustrated in FIG. 2 is that the coma corrector 211 is not united with the objective lens. Therefore, when the objective lens 212 moves for decentering of the optical disc 250 during tracking control, deviation of a center of the objective lens 212 relative to that of the coma corrector 211, and astigmatism may occur.

On the contrary, in this embodiment, the two-dimensional actuator 255 of the objective lens 212 is driven by a tracking error signal output from the TR circuit 224, and the coarse actuator is driven by low frequency components obtained by allowing the tracking error signal to pass through a low-pass filter (LPF) 601. Thus, the low frequency components showing large decentering are compensated by moving the whole of the head by use of the coarse actuator 222, and high frequency components that cannot be followed by the coarse actuator 222 are compensated in the two-dimensional actuator 255. At this time, frequency characteristics of the low-pass filter 601 and the tracking circuit 224 are adjusted so that a movement amount of the two-dimensional actuator 255 is less than decentering permissible limits of the coma corrector and the objective lens and the tracking error is fully suppressed. Usually, since an amplitude of the high frequency component driven by the two-dimensional actuator is about ±10 µm when such a double servo control is performed, decentering of the coma corrector and the objective lens relative to each other is not almost worth considering.

Figure 18:
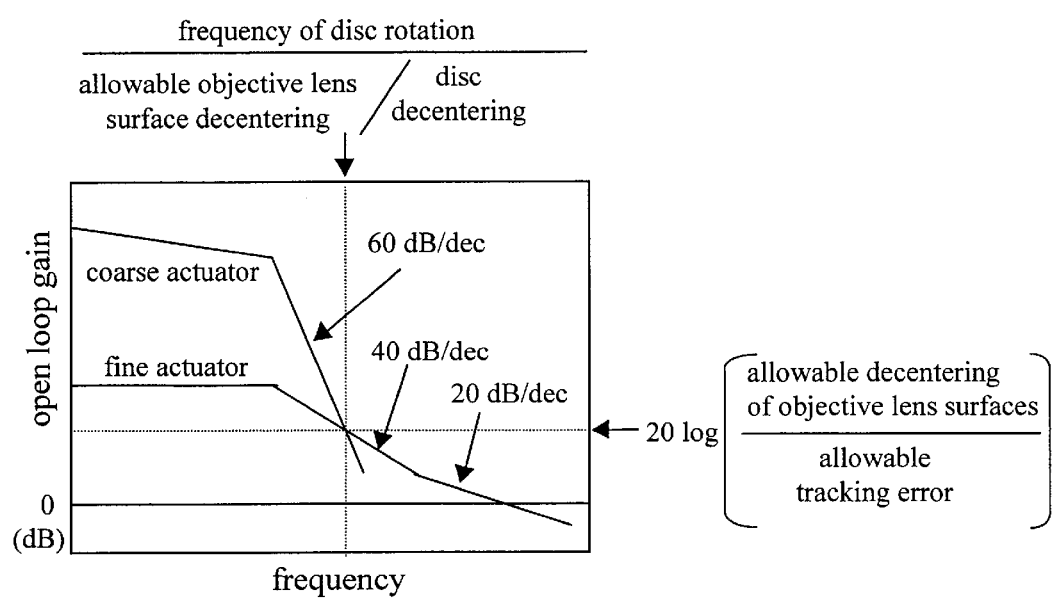
FIG. 18 is a diagram showing an open loop characteristic of a double servo.

FIG. 18 illustrates an example of open loop gain characteristics when the double servo control is performed in the present invention. The abscissa indicates frequencies of the tracking signal by use of a log axis, and the ordinate indicates an open loop gain by use of a dB value.

The coarse actuator has a characteristic that a gain is high in a low frequency region and the gain rapidly decreases in a high frequency region, and the fine actuator has a characteristic that though a gain is low in the low frequency region, the gain can be obtained extendably up to the high frequency region. A response characteristic of the coarse actuator and characteristics of the low-pass filter and the tracking circuit are adjusted so that in the cross point of these two curves, the frequency becomes approximately equal to (Rotation Frequency of Disc/Suppression Ratio of Rotation Decentering Component by Coarse actuator), and an inclination of the characteristic of the coarse actuator becomes the one (60 dB/dec) which decreases by 60 dB when the frequency is multiplied by 10. Herein, the frequency at the cross point is essentially determined as shown in FIG. 18 because the suppression ratio of the rotation decentering component of the coarse actuator must suppress the decentering amount supposed when the disc is actually rotated to a decentering amount permitted for the objective lens. As shown in FIG. 18, in the frequency region (low-frequency region) lower than this frequency at the cross point, the coarse actuator becomes dominant, and in the frequency region (high-frequency region) higher than the frequency at the cross point, the fine actuator becomes dominant. With respect to the gain at the cross point, a value is required as shown in FIG. 18 because the permissible decentering limit of the objective lens that is a remaining deviation suppressed by the coarse actuator must be suppressed to a permissible limit of the tracking error, which is permitted during the tracking control.

Assuming that, in the experiment, a rotation number of the disc be 3000 rpm (50 Hz), the decentering permission limit of the objective lens be ±30 µm, a rotation decentering amount of the disc be ±300 µm, and tracking error limit be ±0.03 µm based on the above described design policy, the actuator, the tracking circuit and the low-pass filter were designed so that a frequency at the cross point is 500 Hz and the gain is 60 dB therein.

Figure 7:
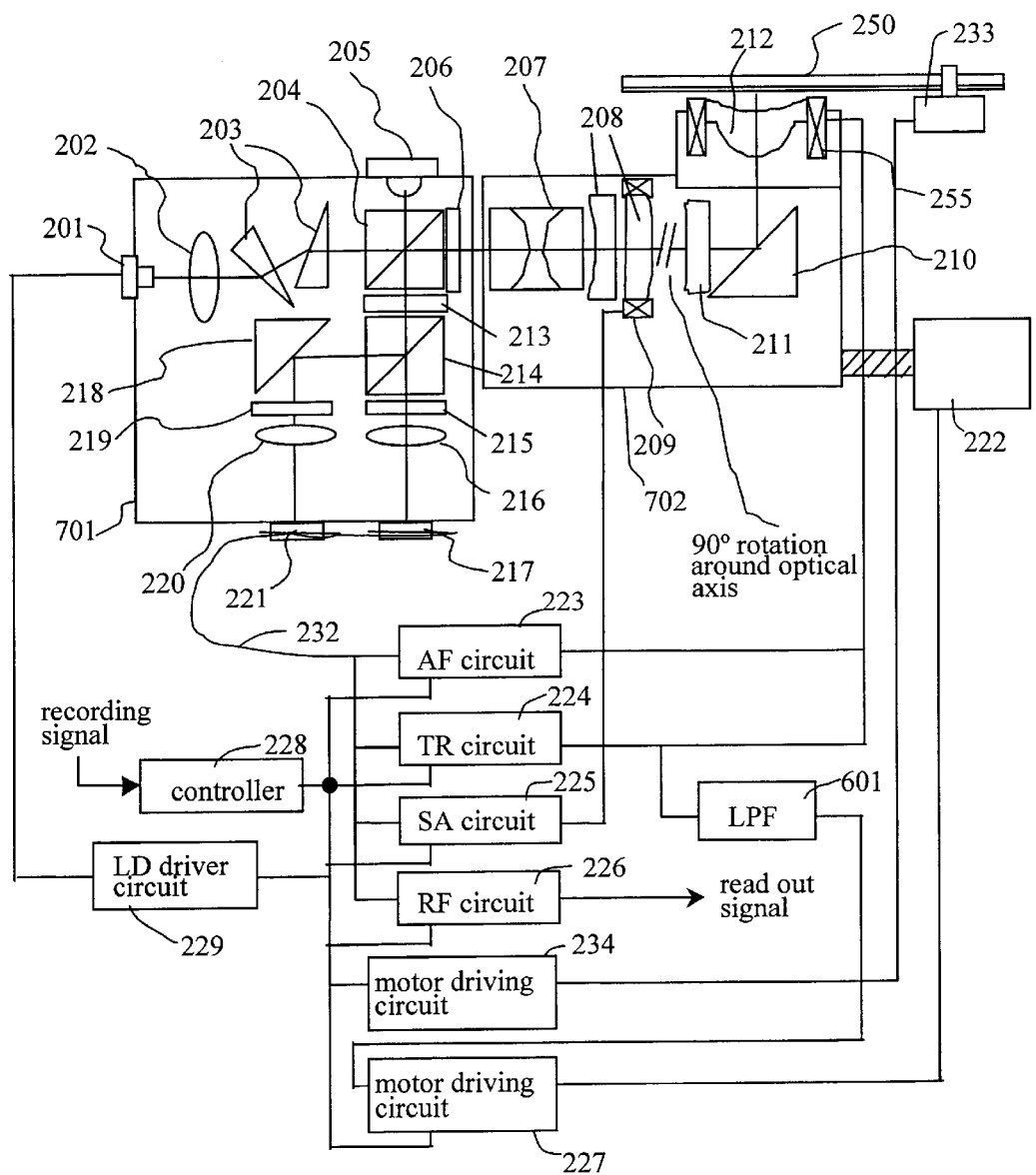
FIG. 7 is a diagram showing a third embodiment of the present invention.

FIG. 7 shows a third embodiment of the present invention. As compared with the second embodiment illustrated in FIG. 6, the number of movable portions moved by a coarse actuator 222 are lessened in this embodiment. The whole of the optical system is separated into a fixing section 701 and a movable section 702, and only the movable section 702 is driven in a radius direction of an optical disc 250 by the coarse actuator 222. A chromatic aberration compensator 207, an expander lens 208, a coma corrector 211, a prism mirror 210, an objective lens 212 and a two-dimensional actuator 255 are loaded on the movable section 702. Since luminous flux incident onto the coma corrector is diverging light beam or converging light beam in the state where aberration is compensated by the chromatic aberration compensating lens (chromatic aberration compensator) 207 and the expander lens 208, a size of a beam incident onto the objective lens and the diverging or converging condition change when the movable section 702 moves in a range from an inner periphery of an optical disc 250 to an outer periphery thereof. In consideration for this, these optical parts are loaded on the movable section 702.

In FIGS. 8(a) and 8(b), a design example of a lens shape based on the present invention is shown. FIG. 8(a) shows principal surface coefficients such as a radius of curvature, a surface interval and a refractive index, and FIG. 8(b) shows coefficients for defining an aspherical shape. At this time, in the drawings, the surface shape is given by a function shown in the lowermost row. "z" indicates a height of the surface in the optical axis direction, and "r" indicates a distance from the optical axis. Herein, the coma corrector generates coma by tilting the device as described in FIG. 5(e). Although an interval between a second surface of the objective lens and a cover layer is 0.9 mm, the lens has a meniscus shape in which the second surface thereof is a concaved surface having a smaller curvature than the first surface. Accordingly, as a substantial working distance, the distance is about 0.7 mm.

Figure 9A:
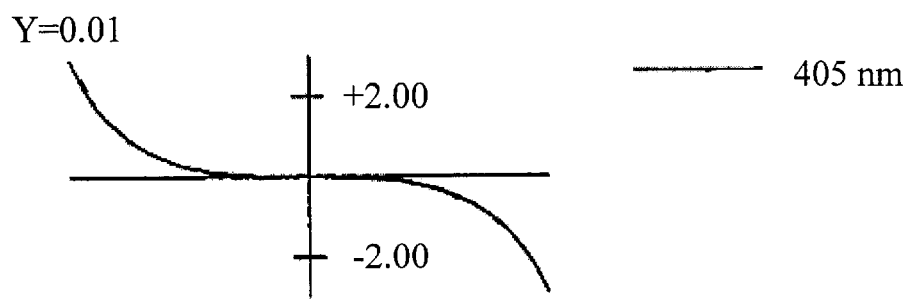
FIGS. 9(a) and 9(b) show wavefront aberration and a reduction effect when a deviation of a center of a lens surface of an objective lens from a center of the other surface thereof exists.
Figure 9B:
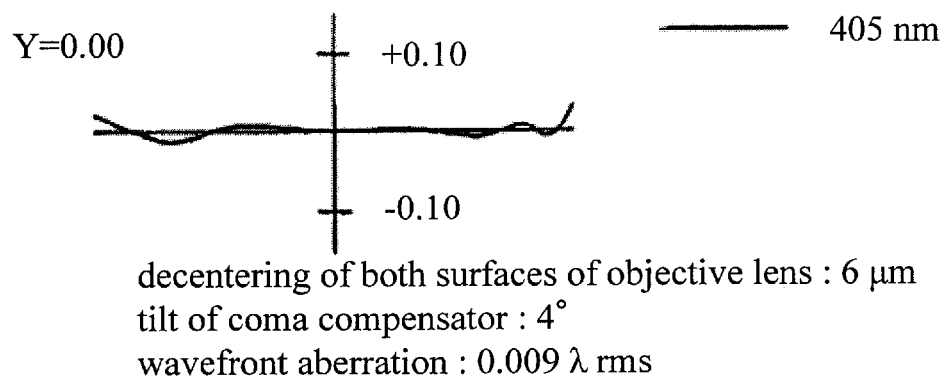

In FIGS. 9(a) and 9(b), wavefront aberration is shown when there is decentering in both surfaces of the objective lens. FIG. 9(a) shows RMS wavefront aberration that is wavefront aberration without a coma compensation when the decentering is 6 µm, and it is found that the coma as large as 0.369 λ occurs. FIG. 9(b) shows wavefront aberration when the coma corrector is tilted by 4° compared to the wavefront aberration of FIG. 9(a). The coma is corrected, and the RMS wavefront aberration remaining is reduced to 0.009 λ.

Figure 10:
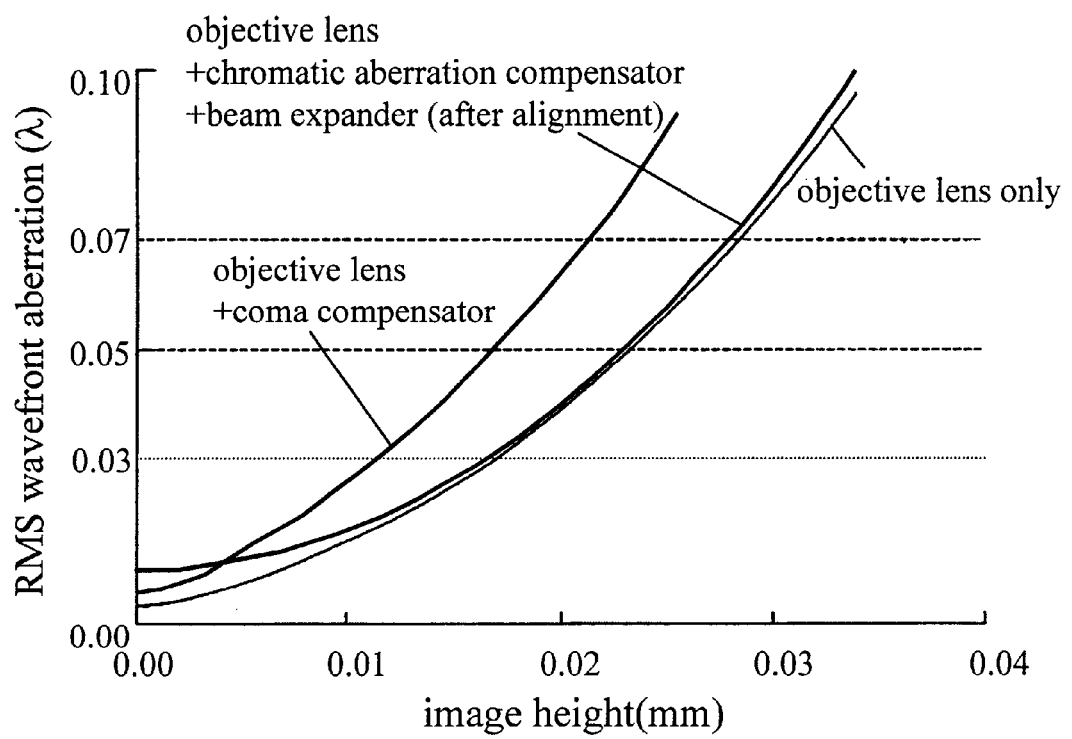
FIG. 10 shows a relation between image height characteristics of wavefront aberration.

FIG. 10 shows RMS wavefront aberration for a height of an image from the optical axis on a focus surface of the objective lens. When the objective lens alone, the chromatic aberration compensator and the beam expander are combined, a radius of 20 µm or more can be secured in a range of the RMS wavefront aberration of 0.05 λ. When there is the coma corrector, image height characteristics are deteriorated. Since the coma corrector generates coma for light beam incident thereonto obliquely, it is considered that the deterioration of the image height characteristics is inevitably unavoidable.

Figure 11A:
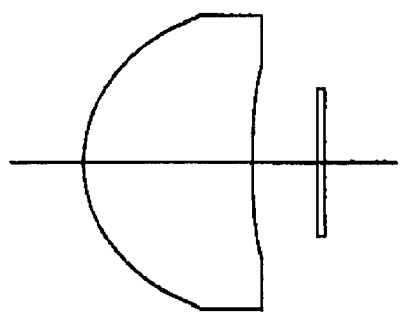
FIGS. 11(a) and 11(b) are views showing a surface shape of a single objective lens and ray aberration thereof.
Figure 11B:
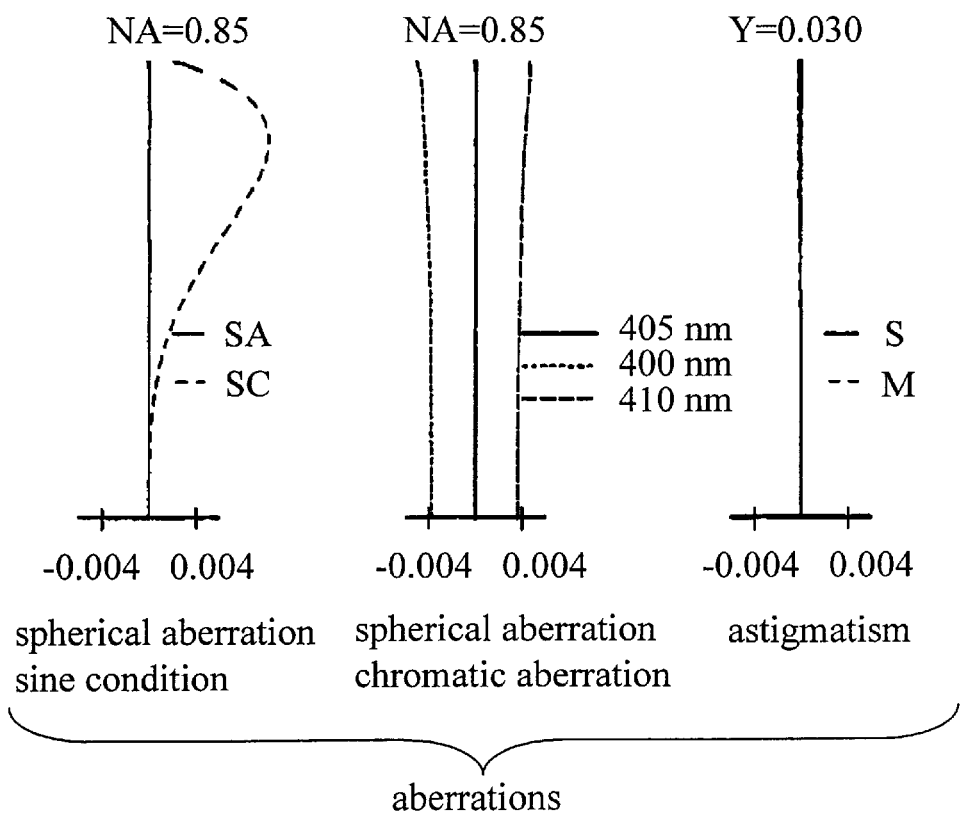

FIGS. 11(a) and 11(b) illustrate a surface shape of the objective lens along and aberration of a light beam. FIG. 11(a) illustrates the surface shape, and FIG. 11(b) illustrates the aberration. FIG. 11(b) teaches that spherical aberration is approximately coincident with the ordinate and the spherical aberration is sufficiently corrected. Moreover, a sine condition is almost compensated. It is found that chromatic aberration occurs by about ±4 µm for wavelength error of ±5 µm. Astigmatism does not practically occur.

Figure 12A:
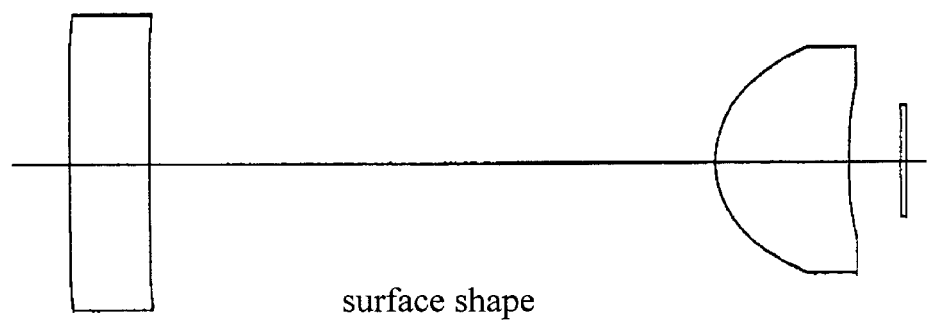
FIGS. 12(a) and 12(b) are views showing a surface shape and ray aberration when an objective lens and a coma corrector are combined.
Figure 12B:
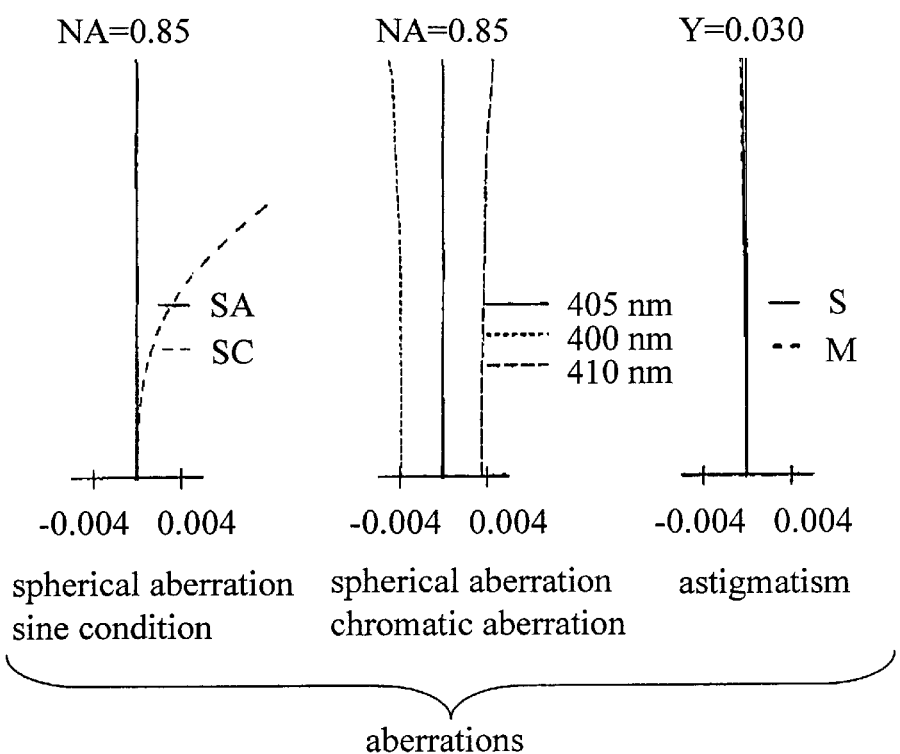

FIGS. 12(a) and 12(b) are a surface shape and aberration when the objective lens and the coma corrector are combined. FIG. 12(a) illustrates the surface shape, and FIG. 12(b) illustrates the aberration. By introducing the coma corrector, a sine condition is deteriorated to some extent. The deterioration of the sine condition causes the deterioration of the image height characteristics when the objective lens and the coma corrector are combined shown in FIG. 10.

It is considered that the deterioration of the image height characteristics is also unavoidable as long as coma must be generated by allowing light beam to be incident obliquely onto the coma corrector.

Figure 13A:
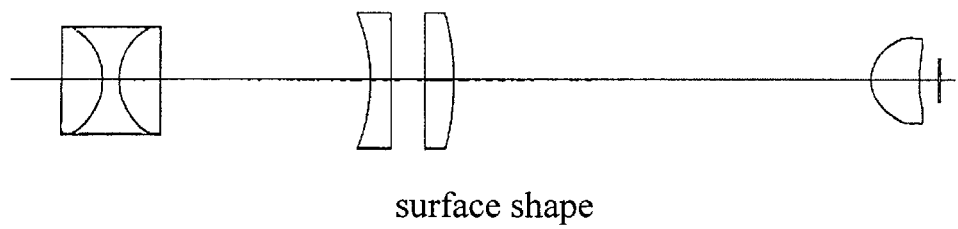
FIGS. 13(a) and 13(b) are views showing a surface shape and ray aberration when an objective lens, an expander lens and a chromatic aberration compensator are combined.
Figure 13B:
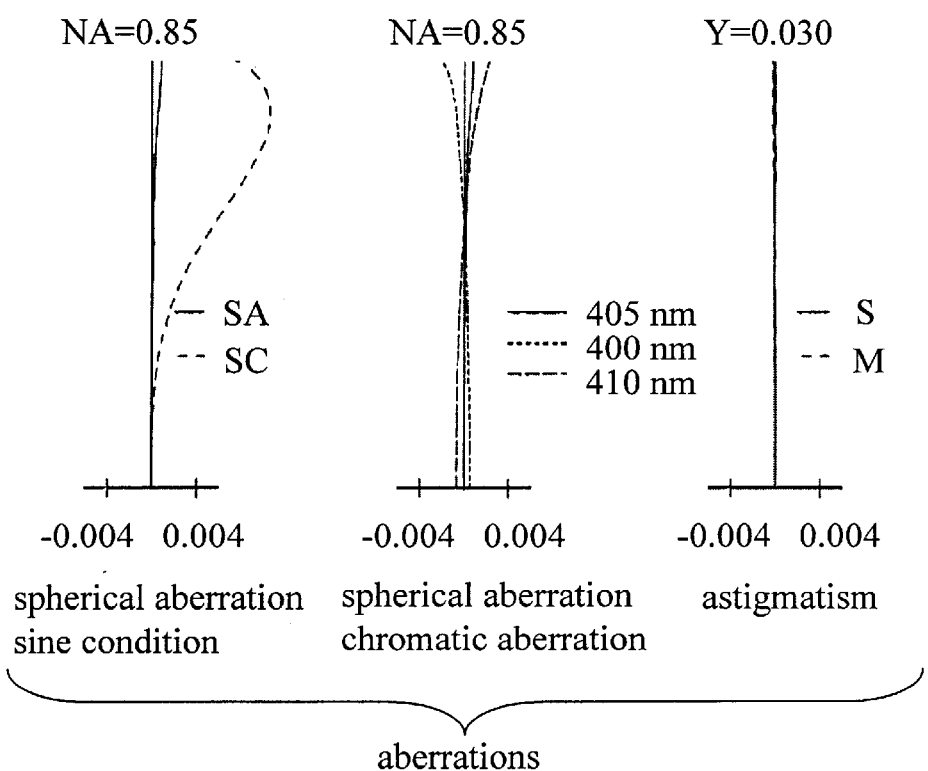

FIGS. 13(a) and 13(b) are a surface shape and aberration when the objective lens, the expander lens and a chromatic aberration compensating lens are combined. It is found that chromatic aberration is more reduced by the chromatic aberration compensating lens compared to FIG. 11(b) and FIG. 12(b).

Figure 14:
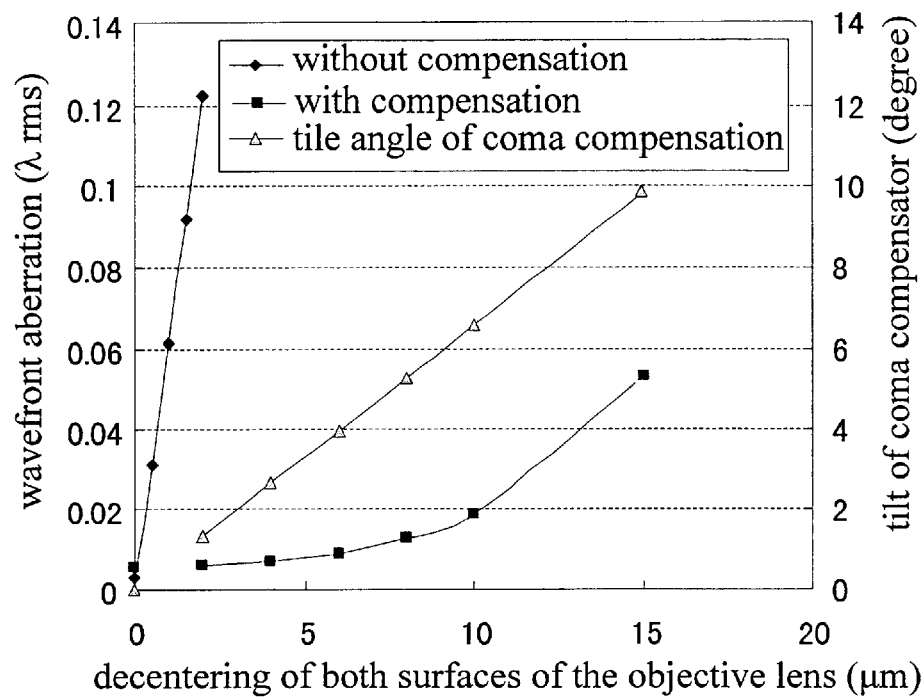
FIG. 14 shows a compensation effect of a coma corrector for decentering of both surfaces of the objective lens relative to each other.
Figure 15:
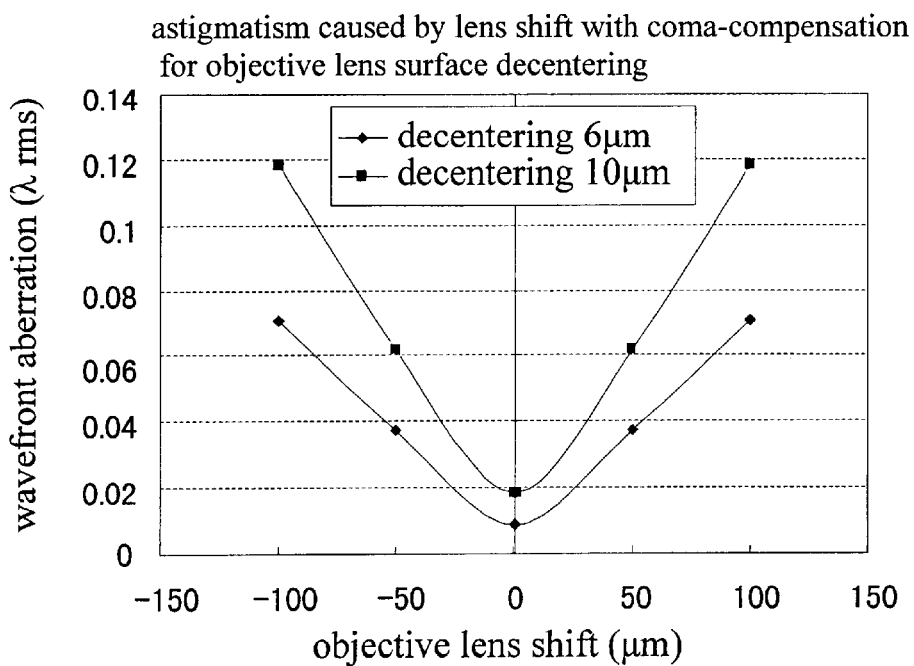
FIG. 15 is a views showing influence of an objective lens shift when coma is compensated by the coma corrector.

FIG. 14 illustrates wavefront aberration with and without the compensation by the coma corrector and a tilt angle of the coma corrector vs. decentering of both surfaces of the objective lens. It is found that when there is no compensation, the aberration rapidly increases for the decentering of the both surface of the objective lens, and when the compensation is made, a decentering amount can be permitted to about 15 µm. It is found that the aberration at this time can be compensated with the tilt angle of the compensator of about 10° when the curve with symbol Δ is viewed from the right ordinate. Accordingly, the angle is considerably large, and adjustment is considered to be easy, FIG. 15 shows occurrence of astigmatism by decentering of the objective lens when the coma is compensated by the coma corrector. When the decentering of the both surface of the objective lens of 10 µm is compensated, it is found that assuming that a permissible limit of the RMS wavefront aberration be 0.05 λ, a permissible λ limit of a shift amount of the objective lens is about ±40 µm. Although this value is too small to compensate the decentering of the disc by the two-dimensional actuator alone being loaded with the lens, this value can achieve the compensation of the decentering of the disc satisfactorily in the constitution to drive the coarse actuator with low frequency components of the tracking signal.

Figure 16:
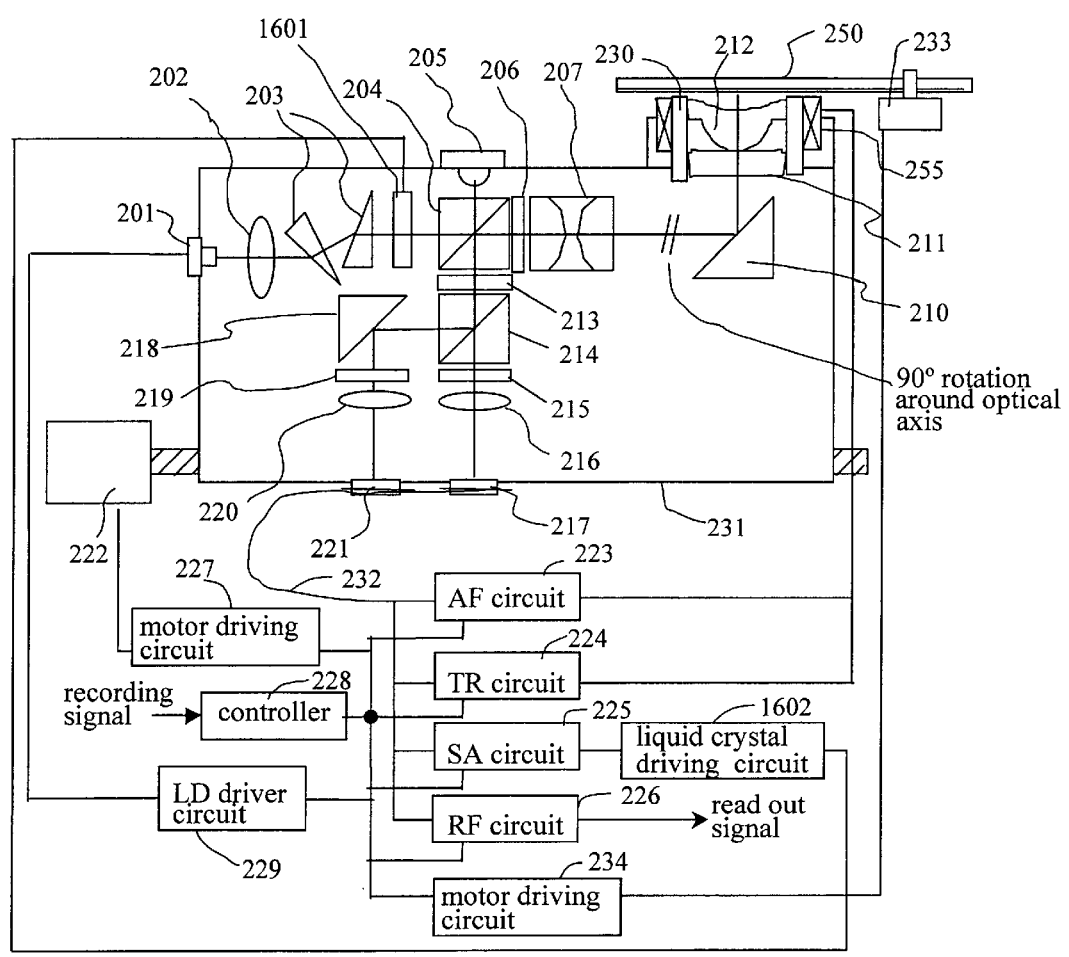
FIG. 16 is an explanatory view for explaining a fourth embodiment of the present invention.

FIG. 16 illustrates a fourth embodiment of the present invention, in which a spherical aberration compensation is performed by a liquid crystal phase compensator 1601 in stead of the expander lens in the structure described in FIG. 2. The liquid crystal phase compensator is inserted between a beam shaping prism 203 and a polarization beam splitter 204. The reason why such a constitution is adopted is as follows. To increase light utility efficiency, the polarized light beams incident onto the polarization beam splitter 204 on the first and second halves of the optical path is rotated by 90° relative to each other by the polarization beam splitter 204 and a λ/4 plate 206. Accordingly, since a phase shift is added to a linear polarization component alone in a specific direction, the liquid crystal device acts on only one of the first and second halves of the optical path even if the liquid crystal device is inserted closer to the disc than to the polarization beam splitter. On the other hand, since the light beam transmitting through the liquid crystal device shows a little light amount loss, the liquid crystal device 1601 is inserted closer to the laser than to the polarization beam splitter as shown in FIG. 16 in order to prevent the light amount loss. The liquid crystal device 1601 is driven by a liquid crystal driving circuit 1602 depending on an output from a spherical aberration detection circuit 225.

The constitution using the liquid crystal device 1601 in stead of the expander lens as described above can be similarly applied to the second and third embodiments shown in FIGS. 6 and 7. Particularly, also when this constitution is applied to the third embodiment shown in FIG. 7, the liquid crystal device 1601 can offer only spherical aberration without changing a diverging or converging condition of light beam unlike the expander lens. Accordingly, there is no obstacle when the liquid crystal device is set up in the fixed optical system.

Figure 17:
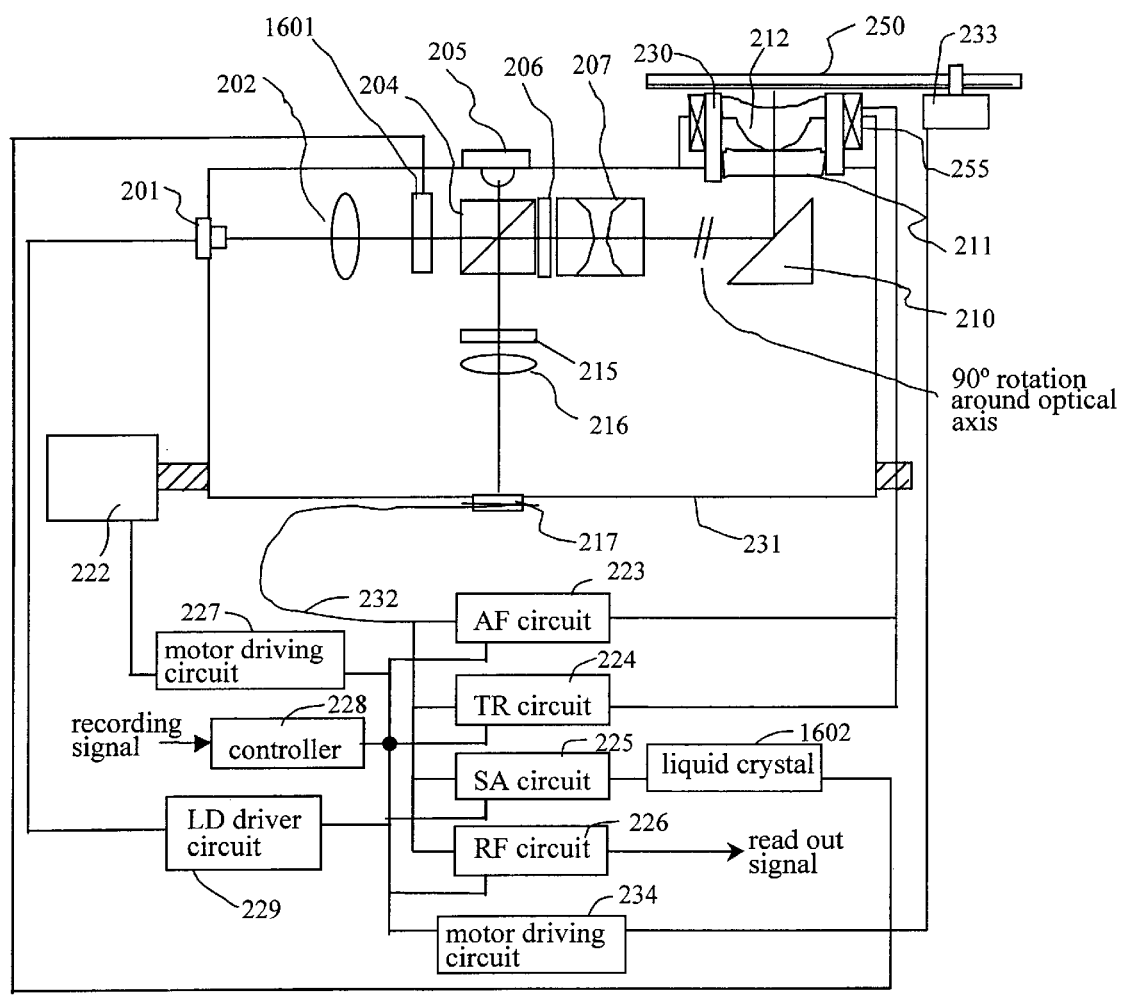
FIG. 17 is an explanatory view for explaining a fifth embodiment of the present invention.

FIG. 17 illustrates an embodiment which is obtained by further simplifying the fourth embodiment and made further akin to a final constitution of products of the optical disc apparatus. The detection optical system unifies a tracking signal detection and a focus signal detection. This can be realized by a constitution in which a beam splitting hologram is split finely, and a tracking error signal, a focus error signal and a spherical aberration signal are simultaneously obtained by a detector pattern. Moreover, if a blue laser is used for the semiconductor laser, and if an NA of the objective lens is large, a power density at the light convergence spot is very high, and it is considered that sufficiently high efficiency is secured in recording. Accordingly, it is sufficiently possible to realize a design without beam shaping. Therefore, a beam shaping prism is removed.

According to another aspect of the present invention, there is provided optical information reproducing apparatuses described below.

(1) An optical information reproducing apparatus, comprising:
a light source;
a light convergence optical system including a coma corrector and an objective lens having a numerical aperture of 0.8 or more, the light convergence optical system collecting a light beam from said light source onto a medium;
a first actuator for making a position of a light spot on the medium variable, onto which is formed by said light convergence optical system, the first actuator being loaded with said objective lens and being driven independently from said coma corrector;
a beam splitting device for splitting a reflected light beam from said medium from an optical path extending from said light source to an optical information medium;
a detection optical system for guiding said reflected light beam, which is split by said beam splitting device, to a photodetector;
the photodetector for detecting a reflected light intensity as an electrical signal;
a second actuator being loaded with said light convergence optical system and said first actuator and being movable relative to said medium; and
a circuit for detecting a tracking error signal from an output signal from said photodetector.

(2) The optical information reproducing apparatus according to item (1), wherein said first actuator is driven by a high frequency component of a tracking signal, and said second actuator is driven by a low frequency component of the tracking signal.

(3) The optical information reproducing apparatus according to one of items (1) and (2), wherein a spherical aberration compensator is further provided in said light convergence optical system.

(4) The optical information reproducing apparatus according to one of items (1), (2) and (3), wherein spherical aberration detection means is further provided in said detection optical system.

(5) The optical information reproducing apparatus according to one of items (1), (2), (3) and (4), wherein said coma corrector has both surfaces formed with a rotation symmetry fourth order curved surface having a curvature on the center axis which is approximately zero.

(6) The optical information reproducing apparatus according to one of items (1), (2), (3), and (4), wherein said coma corrector is a liquid crystal phase compensator.

(7) An optical information reproducing apparatus, comprising:

an optical head having a case accommodating a light source; a light convergence optical system in which a coma corrector and an objective lens having a numerical aperture of 0.8 or more are unified with the case interposed therebetween so that relative positions of the coma corrector and the objective lens are fixed, the light convergence optical system collecting a light beam from said light source onto a medium; a first actuator for making a position of a light convergence spot on the medium variable, which is formed by said light convergence optical system, the first actuator being loaded with said objective lens and being driven independently from said coma corrector; a beam splitting device for splitting a reflected light beam from said medium from an optical path extending from said light source to said medium; a detection optical system for guiding said reflected light beam, which is split by said beam splitting device, to a photodetector; the photodetector for detecting a reflected light intensity as an electrical signal;

a second actuator being loaded with said optical head and being movable relative to said medium; and a circuit for detecting a tracking error signal from an output signal from said photodetector.

(8) The optical information reproducing apparatus according to item (7), wherein said first actuator is driven by a high frequency component of a tracking signal, and said second actuator is driven by a low frequency component of the tracking signal.

(9) The optical information reproducing apparatus according to one of items (7) and (8), wherein a spherical aberration compensator is further provided in said light convergence optical system.

(10) The optical information reproducing apparatus according to one of items (7), (8) and (9), wherein a spherical aberration detection means is further provided in said detection optical system.

(11) The optical information reproducing apparatus according to one of items (7), (8), (9) and (10), wherein said coma corrector has both surfaces formed with a rotation symmetry fourth order curved surface having a curvature on the center axis which is approximately zero.

(12) The optical information reproducing apparatus according to one of items (7), (8), (9), (10) and (11), wherein said coma corrector is a liquid crystal phase compensator.

The present invention realizes objective lens with a large NA having a wide working distance and provides an optical disc apparatus with a high reliability, in which the lens hardly collides with the disc.

What is claimed is:

1. An objective lens optical system comprising:

a coma corrector; and an objective lens for collecting light beams, the objective lens having a numerical aperture of 0.8 or more, wherein the coma corrector and the objective lens are unified with a case interposed therebetween so that relative positions of the coma corrector and the objective lens are fixed.

2. An optical head, comprising:

a light source;

a light convergence optical system, in which a coma corrector and an objective lens having a numerical aperture of 0.8 or more are unified with a case interposed therebetween so that relative positions of the coma corrector and the objective lens are fixed, the light convergence optical system collecting a light beam from said light source onto a medium to form a light convergence spot on the medium;

an actuator for making a position of the light convergence spot on the medium variable;

a beam splitting device for splitting a reflected light beam from said medium from an optical path extending from said light source to said medium;

a photodetector for detecting a light intensity as an electrical signal; and a detection optical system for guiding said reflected light beam, which is split by said beam splitting device, to the photodetector.

3. The optical head according to claim 2, wherein said light convergence optical system further includes a spherical aberration compensator.

4. The optical head according to claim 2, wherein a spherical aberration detector is provided in said detection optical system.

5. The optical head according to claim 2, wherein said coma corrector has both surfaces formed with a rotation symmetry fourth order curved surface having a curvature on the center axis which is approximately zero.

6. The optical head according to claim 2, wherein said coma corrector is a liquid crystal phase compensator.

7. An optical information reproducing apparatus, comprising:

a light source;

a light convergence optical system, in which a coma corrector and an objective lens having a numerical aperture of 0.8 or more are unified with a case interposed therebetween so that relative positions of the coma corrector and the objective lens are fixed, the light convergence optical system collecting a light beam from said light source onto a medium to form a light convergence spot on the medium;

an actuator for making a position of the light convergence spot on the medium variable;

a beam splitting device for splitting a reflected light beam from said medium from an optical path extending from said light source to said medium;

a photodetector for detecting a light intensity as an electrical signal;

a detection optical system for guiding said reflected light beam, which is split by said beam splitting device, to the photodetector;

a detection circuit for detecting a position control signal of said light convergence spot from an output signal from said photodetector; and means for driving said actuator by said control signal.

\* \* \* \* \*